United States Patent [19]
Chapman

[11] Patent Number: 5,847,318
[45] Date of Patent: Dec. 8, 1998

[54] HAND HOLE REINFORCEMENT ASSEMBLY

[76] Inventor: William A. Chapman, 2706 S. Horseshoe Dr., Naples, Fla. 33942

[21] Appl. No.: 733,710

[22] Filed: Oct. 17, 1996

Related U.S. Application Data

[63] Continuation-in-part of Ser. No. 250,724, May 27, 1994, abandoned.

[51] Int. Cl.[6] ........................................ H02G 3/22
[52] U.S. Cl. ............................................. 174/45 R
[58] Field of Search ..................... 174/45 R, 48, 174/65 G, 151, 152 R, 135, 153 G, 136; 220/3.6, 3.2; 248/56, 71, 27.1; 52/220.1; 16/2.1

[56] References Cited

U.S. PATENT DOCUMENTS

| | | | |
|---|---|---|---|
| 2,540,784 | 2/1951 | Hocher | 174/45 R |
| 2,807,850 | 11/1957 | Davidson | 24/141 |
| 3,257,496 | 6/1966 | Hamilton | 174/38 |
| 3,364,952 | 1/1968 | Scaglione et al. | 138/92 |
| 5,069,586 | 12/1991 | Casey | 411/339 |
| 5,537,714 | 7/1996 | Lynch, Jr. et al. | 16/2 |
| 5,553,730 | 9/1996 | Kohnen | 220/3.2 |

*Primary Examiner*—Nestor Ramirez
*Assistant Examiner*—Joseph Waks
*Attorney, Agent, or Firm*—Oldham & Oldham Co., L.P.A.

[57] ABSTRACT

A reinforcement assembly for use in the hand access hole of a tubular shaft. In one embodiment, the assembly includes a pair of units placed opposing each other with one being inside the shaft and the other being outside the shaft. Each unit has a plurality of tenons that mate with open spaces of the opposing unit, and each has a flange surrounding the tenons that contact the shaft in the area immediately surrounding the hand hole. The two units are attached to each other and to the shaft by bolts or other suitable fastening devices. In another embodiment of this invention, the pair of units are positioned one inside the other with at least one mating mortise and tenon union for securely linking the units. A typical application of the assembly is reinforcement of the area surrounding the hand hole of a utility pole.

18 Claims, 8 Drawing Sheets

HAND HOLE REINFORCEMENT ASSEMBLY

CROSS-REFERENCE TO RELATED APPLICATIONS

This application is a continuation-in-part of U.S. Patent application Ser. No. 08/250,724 filed May 27, 1994, now abandoned.

TECHNICAL FIELD

The present invention relates to a hand access hole assembly for reinforcing the hand access hole in a tubular shaft. Numerous applications of tubular shafts, for example, utility poles such as those supporting street lights and traffic signals, require access into the interior of the shaft for installation and maintenance purposes. It is well known that creation of an access hole causes a loss of strength at and near the point where the hole is created. Reasons for loss of strength include elimination of material at the site of the hole and application of heat that can cause metallurgical changes. It is therefore desirable to reinforce the shaft at the point where an access hole has been created. The present invention provides a hand access hole assembly that restores the strength of the shaft to at least its level before the hole was made and is, moreover, inexpensive to fabricate and convenient to use.

BACKGROUND OF THE INVENTION

There are, of course, numerous devices and techniques known in the art for dealing with the consequences of providing access holes in tubular shafts. Recent natural disasters, including Hurricane Andrew, have brought about an increased public awareness of potential hazards and the damage that can occur due to failure of utility poles.

Various aspects of hand holes in tubular shafts are disclosed (or shown) in U.S. Pat. Nos. 3,364,952, 3,550,637, 3,624,269, and 4,914,258. Of the foregoing, only U.S. Pat. No. 3,550,637 deals with a device and method for strengthening the shaft after a hole has been made therein. In the latter patent a plate having a hole corresponding to the hole in the tubular shaft is welded to the inside surface of the shaft, and a cover is placed over the opening. The present invention differs from that patent, and all other prior art of which I am aware, in many significant respects which will be made apparent in the disclosure that follows.

SUMMARY OF THE INVENTION

The present invention is directed to a hand access hole assembly for use in a tubular shaft having an access hole, wherein the assembly strengthens the tubular shaft in the area of the access hole.

According to a preferred embodiment of the present invention the hand access hole assembly comprises first and second reinforcing units which are secured to one another. The first reinforcing unit has a central opening extending therethrough and a flange portion surrounding the opening for placement inside the shaft at the site of the shaft access hole. The flange portion has a first surface contacting the inner surface of the shaft and having a contour generally the same as the inner contour of the shaft. The first reinforcing unit further includes a plurality of tenons protruding outwardly from the surface, the tenons alternating with open spaces and the outer edges of the tenons defining a shape substantially corresponding to the shape of the access hole in the shaft. The second reinforcing unit also has a central opening extending therethrough and a flange portion surrounding the opening for placement on the outside of the shaft at the site of the shaft access hole. The flange portion has a first surface contacting the outer surface of the shaft and having a contour generally the same as the outer contour of the shaft. The second unit further includes a plurality of tenons protruding inwardly from the surface, the tenons alternating with open spaces and the outer edges of said tenons defining a shape substantially corresponding to the shape of the access hole in the shaft. The tenons and open spaces are positioned such that the tenons of the first unit mate with the spaces of the second unit and the tenons of the second unit mate with the spaces of the first unit forming a periphery that is substantially devoid of open spaces between the tenons.

In another preferred embodiment of the present invention, the hand access hole assembly comprises an outer and an inner reinforcing unit which are secured to one another in a manner which is slightly different from that described above. In this configuration, the outer reinforcing unit has a central opening extending therethrough and a flange portion surrounding the opening for placement inside the shaft at the site of the shaft access hole in a manner as described previously. In one aspect of this embodiment, the outer unit is split into two components for ease of insertion into the access hole of the shaft. However, rather than having a plurality of tenons which protrude outwardly from the surface, the outer unit has a plurality of tenons which protrude inwardly from an interior surface of the outer unit, the tenons configured to be in mating engagement with an equal number of mortises on the inner unit, this second inner unit also having a central opening extending therethrough.

BRIEF DESCRIPTION OF THE DRAWINGS

The structural features and functions of the present invention, as well as the advantages of the present invention, will become apparent from the subsequent detailed description of the preferred embodiments when taken in conjunction with the accompanying drawings, wherein.

DETAILED DESCRIPTION OF THE INVENTION

This invention relates to a reinforcement assembly for the hand access hole to a tubular shaft, and will be described in full below with reference to the drawings. The hand hole provides access to the interior of the tubular shaft for installation and maintenance, and the reinforcement assembly of this invention restores strength to the shaft that was lost by providing the hole therein.

Figure 1:
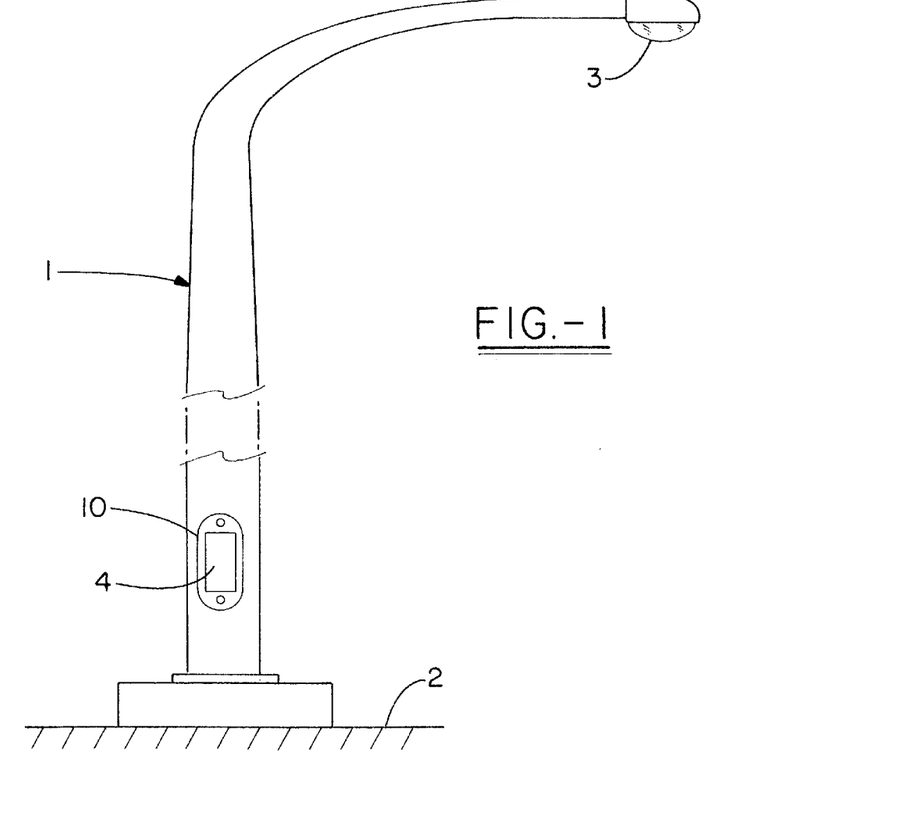
FIG. 1 is a view which illustrates a tubular pole having a hand access hole which incorporates the hand access hole assembly according to the present invention.

FIG. 1 illustrates a tubular shaft, comprising a pole 1 which incorporates the hand access hole assembly 10 constructed according to the present invention. Pole 1 is mounted on the ground 2, and supporting a street light 3. A hand access hole 4 is provided in the pole at a point near the ground for easy access by workers.

Figure 2:
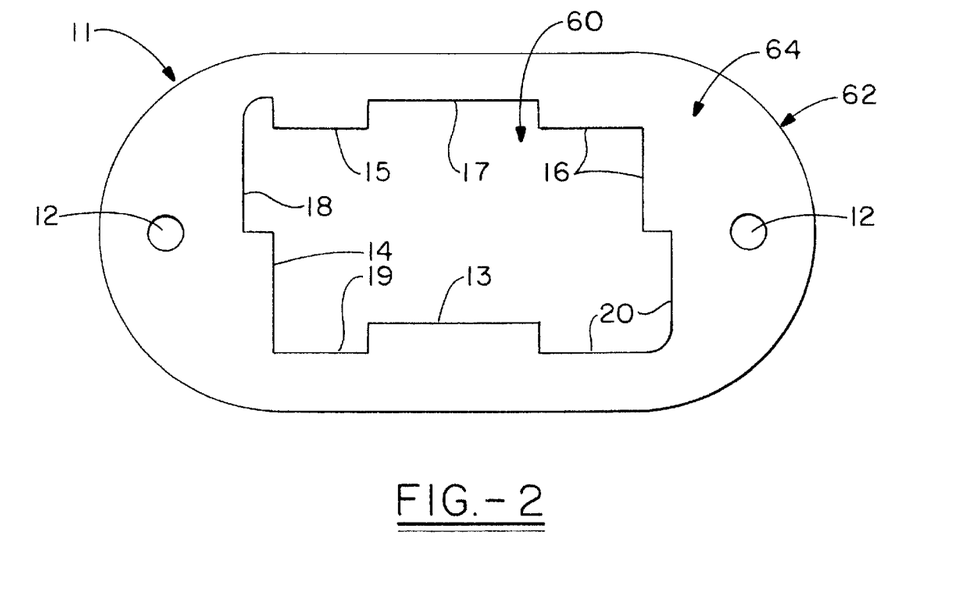
FIG. 2 is a plan view of a first preferred embodiment of the invention.
Figure 3:
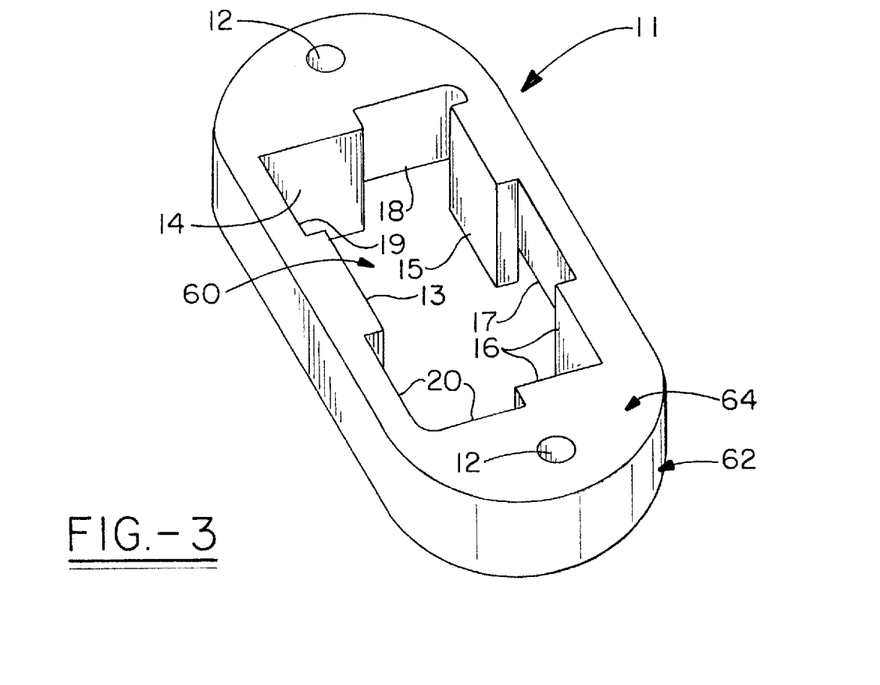
FIG. 3 is a perspective view of the first side of one of the reinforcing units of the first preferred embodiment of the invention.
Figure 4:
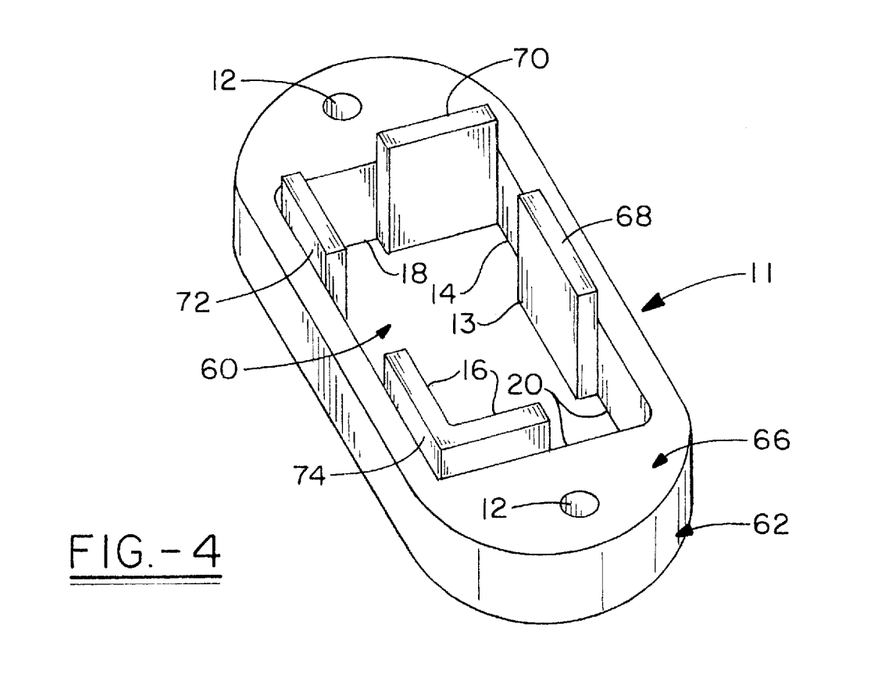
FIG. 4 is a perspective view of the reverse side of the reinforcing unit illustrated in FIG. 3.

The hand access hole assembly 10 comprises two reinforcing units that are joined to each other and to the tubular shaft 1 by fastening means typically comprising bolts and nuts. FIGS. 2–4 illustrate one embodiment of the invention wherein FIG. 2 is a plan view of the first side, FIG. 3 is a perspective view of the first side, and FIG. 4 is a perspective view of the reverse side of one of the reinforcing units, generally indicated by 11. Each unit 11 has holes 12 through which fastening means are inserted for attachment. Unit 11 has four tenons 13, 14, 15, and 16, and four spaces 17, 18, 19, and 20 for receiving the tenons. Each reinforcing unit 11 has a central opening 60 extending therethrough and a flange portion 62 surrounding opening 60. As shown in FIGS. 3 and 4, tenons 13, 14, 15, and 16 are flush with a surface 64 of flange portion 62, on a first side of unit 11, and protrude beyond a surface 66 of flange portion 62 on the reverse side of unit 11.

When installed in a hand access hole the assembly 10 comprises two identical units 11 (except when installed in a round shaft). The two units 11 are assembled with the tenons of one unit sliding into the spaces of the other. That is, tenons 13, 14, 15, and 16 of one unit slide into spaces 17, 18, 19, and 20, respectively, of the second unit. The outer edges 68, 70, 72, and 74 of tenons 13, 14, 15, and 16, respectively, define a shape substantially corresponding to the shape of access hole 4 in shaft 1. In the embodiment illustrated in FIGS. 2–4, surfaces 64 and 66 of flange portion 62 are preferably substantially flat and therefore have a contour which is generally the same as the mating planar surfaces of shaft 1. As shown in FIGS. 3 and 4, tenons 13, 14, 15, and 16 protrude inwardly from surface 64 of flange portion 62 and protrude outwardly, at substantially 90°, from surface 66 of flange portion 62. One unit of the assembly is placed inside the shaft and the other on the outside with the edges around the cut-out in the pole clamped between the two units. Bolts inserted through holes 12 and nuts apply pressure and act as a clamp on the edges around the cut-out, thus reinforcing the shaft 1. The tenons and spaces fit together in a snug but not tight manner. The two units 11 can be easily joined and separated so long as force is applied uniformly, and they are kept substantially parallel to each other. However, if force is applied at approximately 90° at any point around the periphery the tenons will hold the two units rigidly together. This characteristic increases the clamping action around the entire periphery of the cut-out when stress is applied to the shaft (for example, by wind or other external forces) and supplements the holding power of the bolts.

When the two units of the assembly are joined as described, they provide a smooth, uniform hand access hole through the assembly into the interior of the tubular shaft.

Although it does not constitute a part of the present invention, a cover will be provided over the assembly to prevent tampering and the entry of foreign materials.

Figure 5:
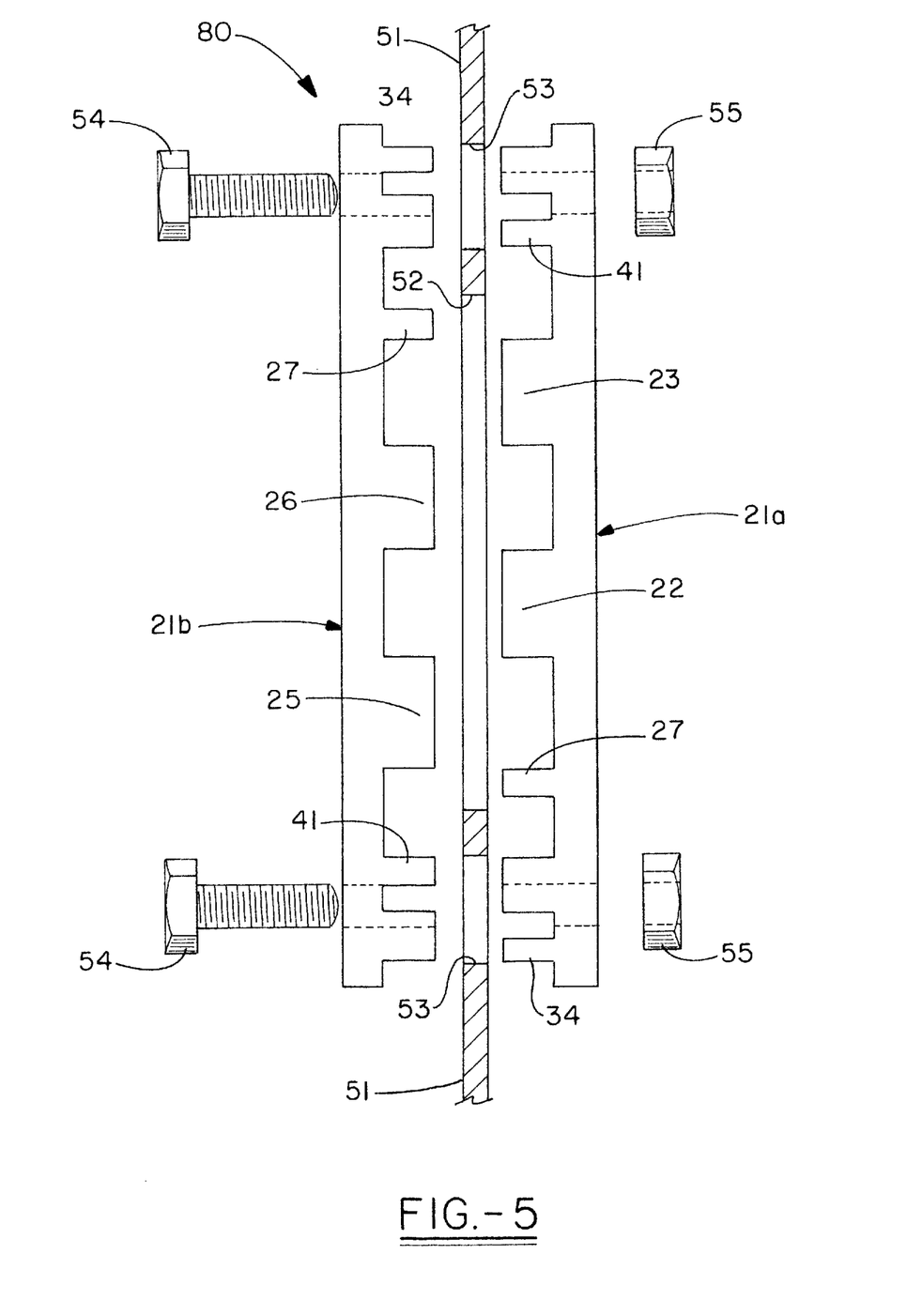
FIG. 5 is an exploded vertical sectional view of a hand access hole assembly and a pole according to a second preferred embodiment of the present invention.
Figures 6, 7:
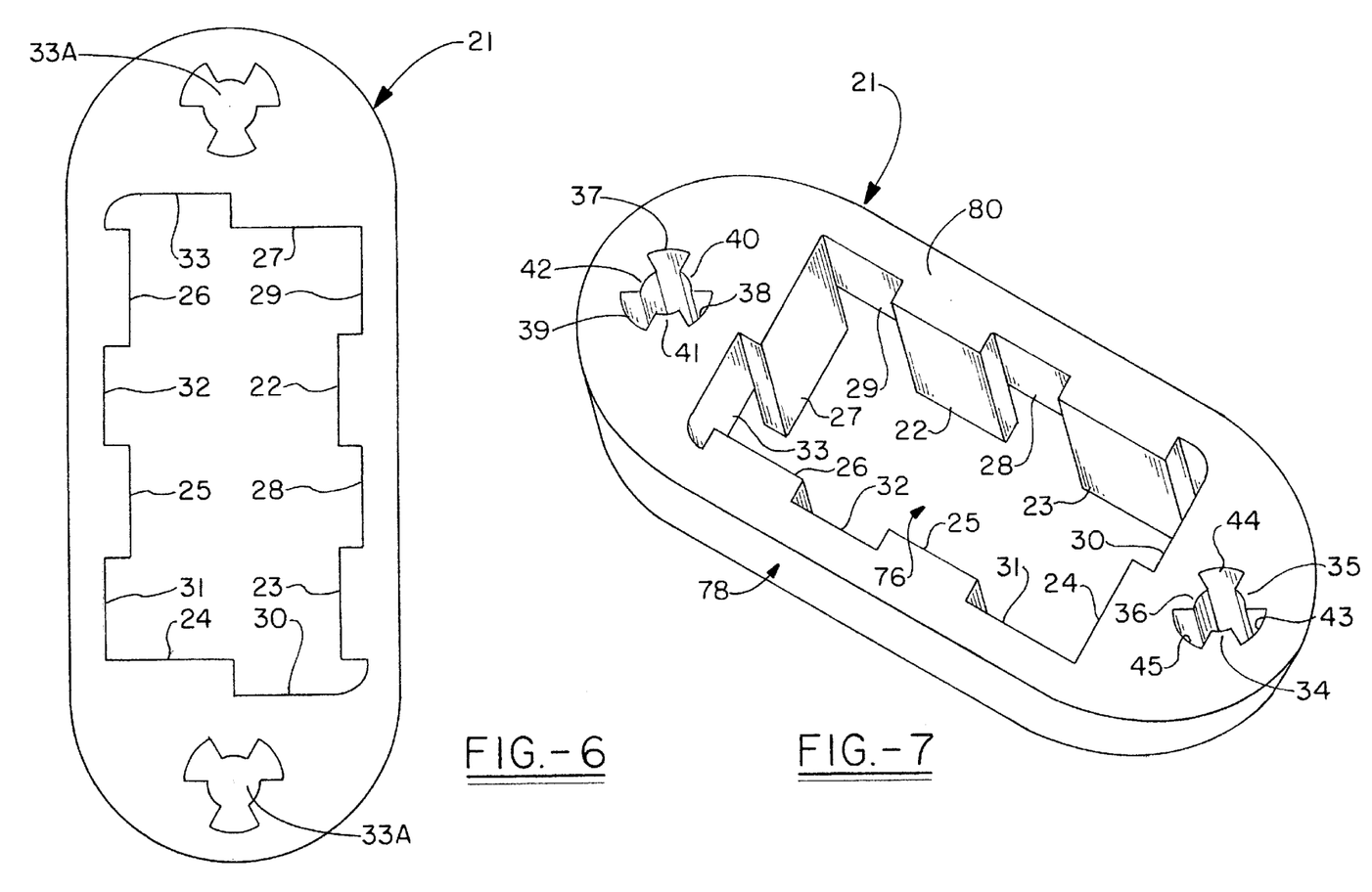
FIG. 6 is a plan view of a second preferred embodiment of the invention.
FIG. 7 is a perspective view of the first side of one of the reinforcing units of the second preferred embodiment.
Figures 8, 9:
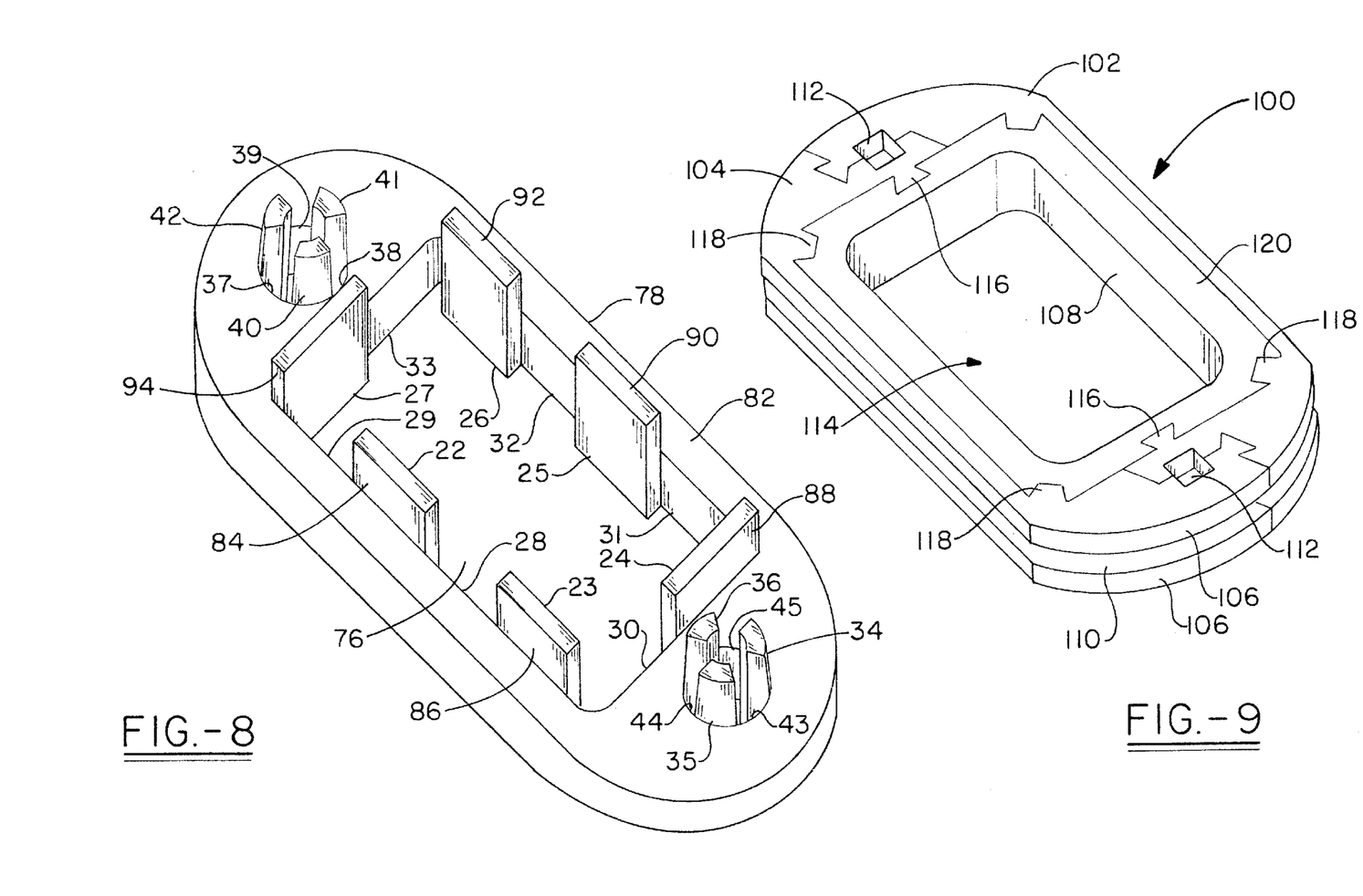
FIG. 8 is a perspective view of the reverse side of the reinforcing unit illustrated in FIG. 7.
FIG. 9 is a perspective view of the first side of one of the reinforcing units of the third preferred embodiment.

FIGS. 5–8 illustrate a second embodiment of the hand access hole assembly of the present invention, indicated generally at 80. As shown in FIG. 5, which is an exploded sectional view of assembly 80, assembly 80 includes two reinforcing units 21 which are identical to one another and are designated as 21a and 21b for purposes of illustration in FIG. 5. FIG. 5 further illustrates the relationship of units 21a and 21b with a wall 51 of a tubular shaft or pole. Hole 52, which provides hand access, and holes 53, for insertion of fastening means, are provided in wall 51 of the shaft by any suitable means. Unit 21a is inserted through hole 52 into the interior of the tubular shaft and held in place while unit 21b is joined with it on the outside of the shaft, and units 21a and 21b are then attached by bolts 54 and nuts 55. FIG. 6 illustrates a plan view of unit a 21 and FIGS. 7 and 8 illustrate perspective views of opposing sides of the unit 21. The two identical units 21 can be fit together, or assembled, to form the assembly 80 by joining the tenons 22, 23, 24, 25, 26, and 27 of a first unit 21 with spaces 28, 29, 30, 31, 32, and 33, respectively, of a second unit 21 in the same manner as described with reference to units 11 illustrated in FIGS. 3 and 4. This embodiment differs from that shown in FIGS. 2–4 by having additional tenons surrounding the hand access hole, and, more significantly, by mount hole tenons surrounding holes 33a. Accordingly, completion of the assembly includes mating tenons 34, 35, 36, 40, 41, and 42 of a first unit with spaces 37, 38, 39, 43, 44, and 45 of a second unit, respectively.

Each unit 21 includes a central opening 76 extending through the unit 21, and a flange portion 78 surrounding the central opening 76. Tenons 22, 23, 24, 25, 26, and 27 protrude inwardly from surface 80 of flange portion 78, as shown in FIG. 7, and protrude outwardly from surface 82 of flange portion 78 as shown in FIG. 8. The tenons 22, 23, 24, 25, 26, and 27 protrude at substantially 90° from surfaces 80 and 82. Additionally, in a manner similar to that of the embodiment of the present invention illustrated in FIGS. 1–4, tenons 22, 23, 24, 25, 26, and 27 include outer edges 84, 86, 88, 90, 92, and 94, respectively, which define a shape substantially corresponding to the shape of access hole 52.

Figure 10:
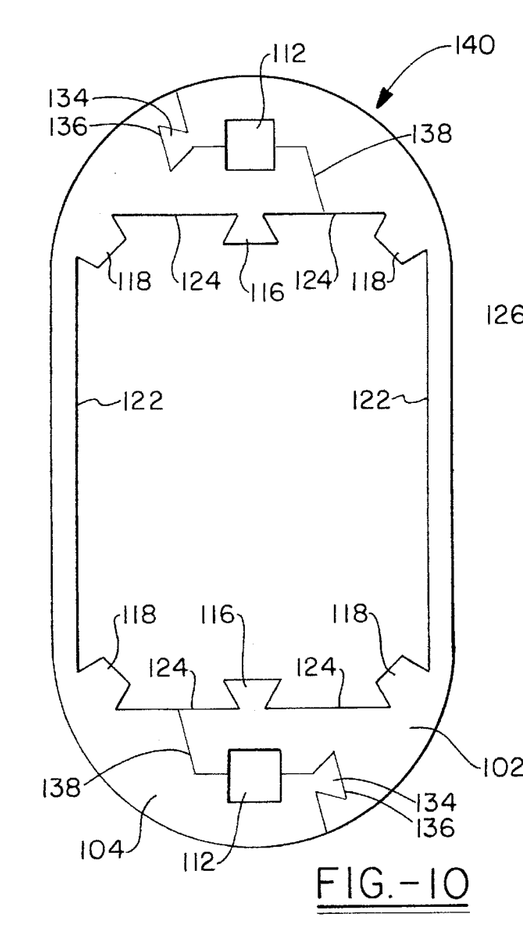
FIG. 10 is a plan view of the third preferred embodiment of an outer part of the reinforcing unit showing inwardly facing tenons.
Figure 11:
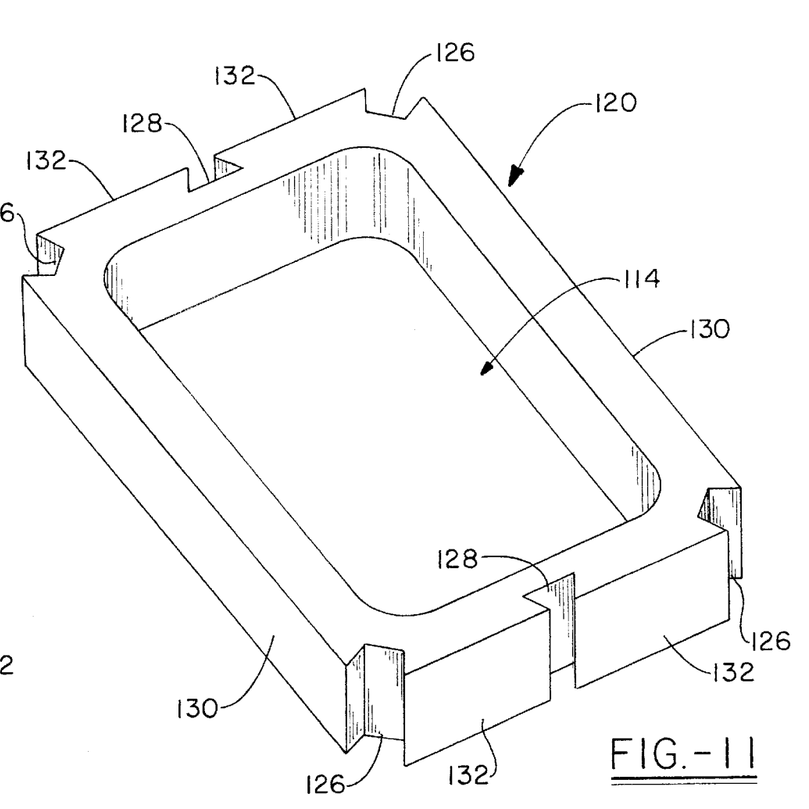
FIG. 11 is a perspective view of the preferred embodiment of an inner part of the reinforcing unit showing outwardly facing mortises to mate with the tenons of the outer reinforcing unit of FIG. 10.

In another embodiment of this invention, shown in FIGS. 9–11, the hand access hole assembly is indicated generally at 100. As shown in FIG. 9, which is a perspective view of the assembly 100, the assembly includes an outer reinforcing unit 140 (shown by itself in FIG. 10) and an inner reinforcing unit 120 (shown by itself in FIG. 11). Hole 114 provides hand access into the tubular shaft, whereas holes 112 are for insertion of fastening means (not shown). As in the previously described embodiments, an outer lip portion 106 which substantially conforms to the opening with the tubular shaft, will serve to define groove 110 which facilitates anchoring within the shaft. In a more preferred embodiment, the outer reinforcing unit 140 is split into two components, a first half 102 and a second mating half 104 to facilitate the insertion of the outer reinforcing unit 140 into the shaft. The outer reinforcing unit 140 has a plurality of tenons 116,118 which protrude inwardly from the inner surface of the unit while the inner reinforcing unit 120 has a corresponding number of mating mortises 126,128 for engagement therewith the tenons.

As seen in FIG. 10, a plurality of tenons 116,118 are positioned about an inner periphery of the outer reinforcing unit 140 with open spaces 122,124 between the inwardly protruding tenons. The shape of the tenon is not critical, but may be tailored to meet the stress demands of the application. The tenon can be dove shaped as seen by tenon 116 or trapezoidal shaped as seen by tenons 118. Other geometric shapes are also envisioned within the scope of this invention, e.g., rectangular or square shaped. In a more preferred embodiment, the outer reinforcing unit 140 is split along 138 into two components, a first half 102 and a second half 104, the two halves being capable of independent insertion into an opening within a shaft and held together by a mating mortise 136 and tenon 134, although other equivalent mating means are additional envisioned to be applicable and yet remain within the bounds of this invention. As illustrated in FIG. 11, an inner reinforcing unit 120 is configured so as to matingly engage with the outer reinforcing unit 140. This unit will have a corresponding number of mortises 126,128 to the number of tenons present about the inner periphery of the outer reinforcing unit 140. While the mating mortise and tenons are shown to be six (6) in number in the figures, more or less are envisioned. It is envisioned that at few as two (2) would be effective in achieving the purposes of this invention. The upper limit is not a fixed number, but rather is a function of the size of the opening in the shaft. It is recognized that the units will fit together in a snug, but not tight manner with the tenons 116,118,134 mating with mortises 128,126,136 respectively and the open spaces 122,124 being adjacent to regions 132,130 respectively.

Figure 12:
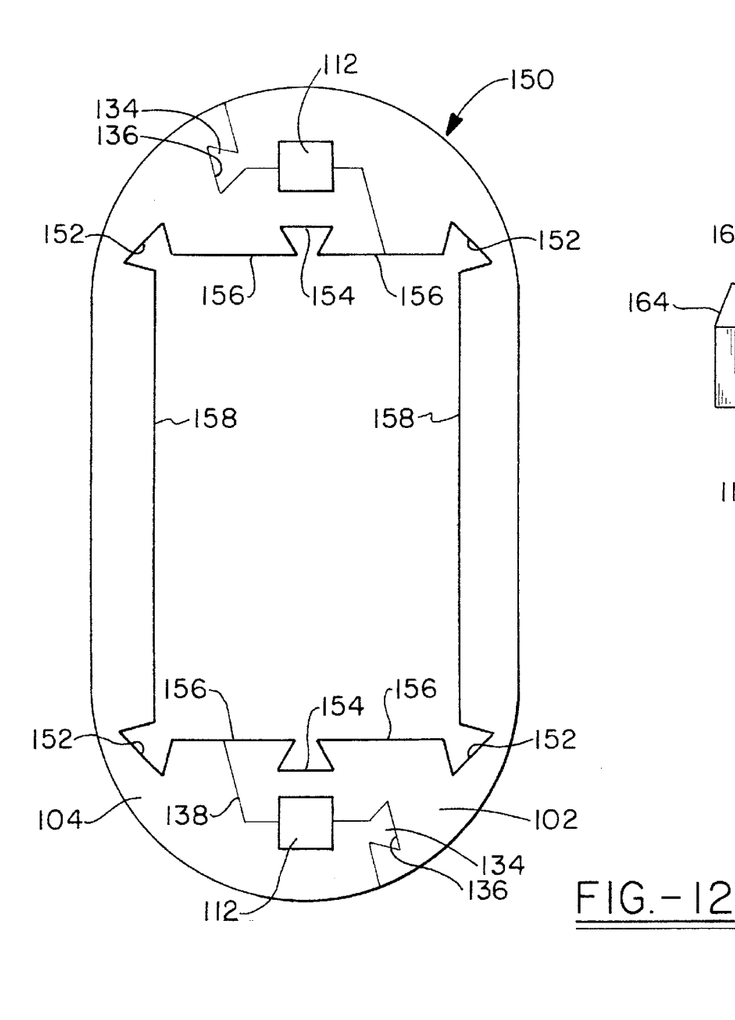
FIG. 12 is a plan view of another embodiment of the invention showing the outer part of the reinforcing unit with mortises.
Figure 13:
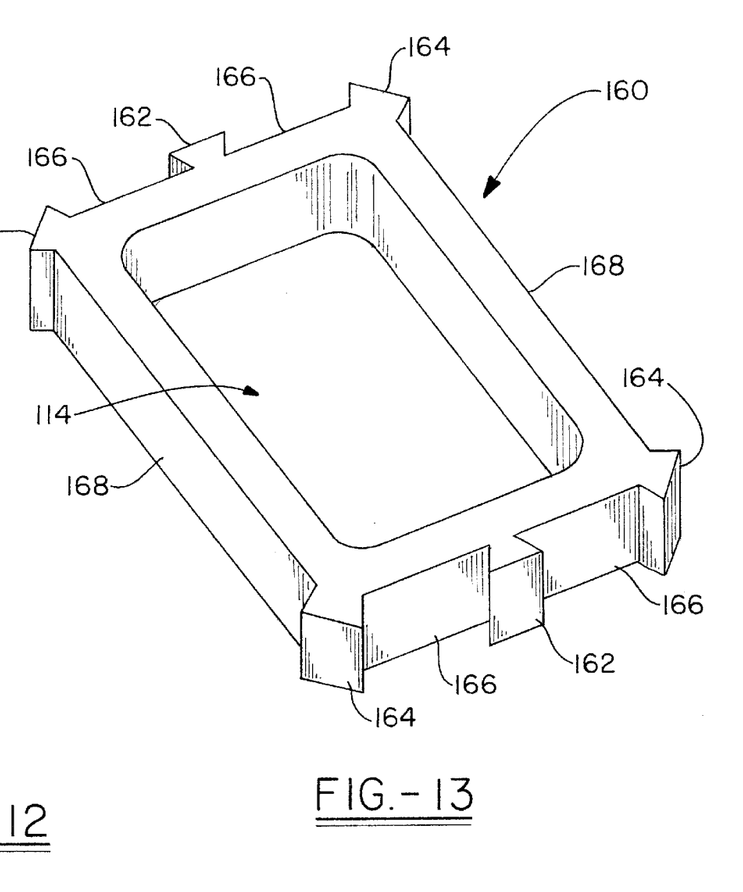
FIG. 13 is a perspective view showing the inner part of the reinforcing unit showing outwardly facing tenons which mate with the mortises shown in FIG. 12.

While the invention in this third embodiment has been described as having at least one tenon in the outer reinforcing member 140 and at least one mating mortise in the inner reinforcing member 120, there is no reason why the locations of the mortises and tenons could not be interposed as seen in FIGS. 12–13. In these figures, the tenons 162,164 are shown as being positioned within inner reinforcing member 160 while the mating mortises 154,152 are shown in the outer reinforcing member 150. As seen in these figures, open spaces 166,168 will be adjacent to regions 156,158 respectively in a manner described previously. All other reference numerals which describe aspects of the invention which have been previously described, are maintained for purposes of continuity.

Figures 14, 15:
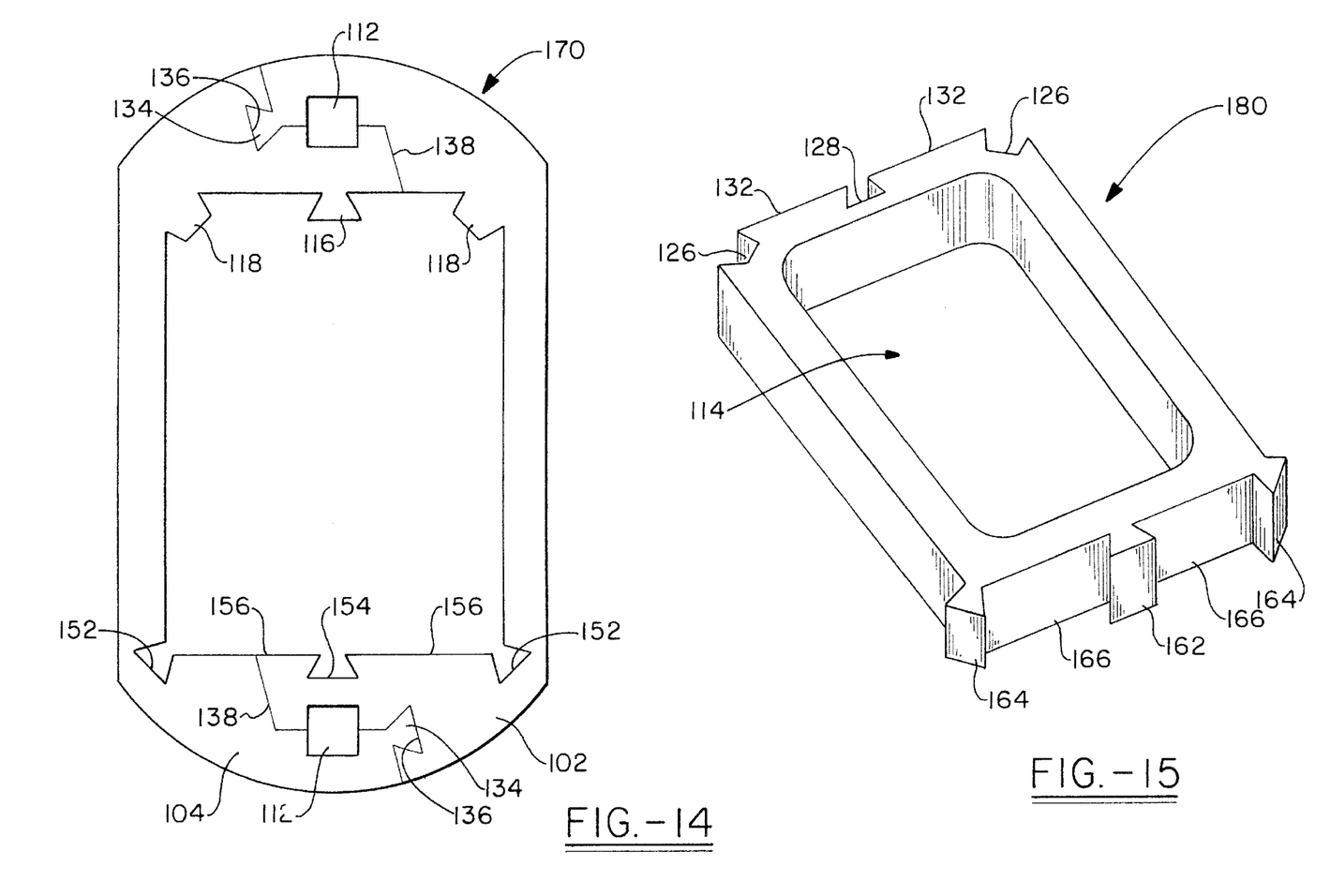
FIG. 14 is a plan view of another embodiment of the invention showing the outer part of the reinforcing unit with at least one tenon and at least one mortise.
FIG. 15 is a perspective view showing the inner part of the reinforcing unit showing at least one tenon and at least one mortise each of which will correspondingly mate with the appropriate mortise or tenon shown in FIG. 14.

In yet another variation of this embodiment of the invention, shown in FIGS. 14–15, the outer reinforcing member 170 is shown to contain at least one tenon 116,118 and at least one mortise 152,154 into which will be matingly inserted an inner reinforcing member 180 which also has at least one tenon 162,164 and at least one mortise 126,128. As seen in these figures, tenons 162,164 will matingly engage mortises 154,152 respectively while tenons 116,118 will matingly engage mortises 128,126 respectively.

While the invention is described and illustrated in the drawings as being installed in tubular shafts having at least one planar surface, it is also contemplated that it be installed in shafts having a substantially round cross section. The two units for use in an assembly installed in a round shaft would be curved at the radius to correspond to the shaft, and therefore could not be identical as in the case of those installed on a planar surface. However, the same principles would apply to the mating and joining of the tenons and spaces as have been described with respect to the assemblies used on a planar surface.

The units used in the hand access hole assemblies described herein can be fabricated from any suitable material. The preferred material, as now contemplated, is aluminum. Also, the units can be made using conventional molding techniques. The assemblies are suitable for numerous applications including poles supporting street lights, traffic signals, stadium lights, other electrical fixtures and other shafts in applications requiring hand access to the interior of the shaft.

The hand access hole assembly of the present invention may be advantageously used for strengthening a tubular shaft at and around the hand access hole in the shaft which is typically provided close to the ground for easy access by maintenance personnel. The hand access hole assembly of the present invention is inexpensive, easy to fabricate and convenient to use, and may be used with either new or existing tubular shafts, having either planar or curved surfaces mating with the reinforcing units of the hand access hole assembly. Further, it is noted that the hand access hole assembly of the present invention may be installed, at the point of use in the field, with simple hand tools. The addition of the hand access hole assembly of the present invention to a tubular shaft allows the shaft to carry increased loads such as those produced by wind acting on the tubular shaft.

While the foregoing description has set forth the preferred embodiments of the invention in particular detail, it must be understood that numerous modifications, substitutions and changes can be taken without departing from the true spirit and scope of the present invention as defined by the ensuing claims. The invention is therefore not limited to specific preferred embodiments as described, but is only limited by the following claims.

What is claimed is:

1. A hand access hole assembly for use in a tubular shaft having an access hole with a periphery, said assembly having an outer reinforcing unit and an inner reinforcing unit, said assembly having an outer edge, said outer edge defining a shape substantially corresponding to the periphery of the access hole in the shaft, said assembly comprising:

said outer reinforcing unit having a central opening extending therethrough and an outer edge, said outer edge engaging the shaft at the access hole, wherein said outer reinforcing unit comprises at least one first attachment mechanism;

said inner reinforcing unit comprises at least one second attachment which matingly engages with said one first attachment mechanism;

said first and second attachment mechanisms comprise at least one mating mortise and tenon;

wherein said at least one mating mortise and tenon extend completely through a thickness of said inner and said outer reinforcing units.

2. The hand access hole assembly of claim 1 wherein the outer reinforcing unit further comprises:

a first half;

a second half; and a joining means to join the first half to the second half.

3. The hand access hole assembly of claim 1 wherein said assembly has at least one attachment hole disposed therethrough.

4. The hand access hole assembly of claim 3 wherein said assembly has at least two attachment holes disposed therethrough.

5. The hand access hole assembly of claim 1 wherein said outer reinforcing unit comprises at least one tenon and at least one mortise; and said inner reinforcing unit comprises at least one tenon and at least one mortise.

6. A hand access hole assembly for use in a tubular shaft having an access hole, said assembly having an outer reinforcing unit and an inner reinforcing unit, said outer unit having an outer edge, said outer edge defining a shape substantially corresponding to the shape of the access hole in the shaft, said assembly comprising:

an outer reinforcing unit having a central opening extending therethrough and an outer edge, said outer edge having a pair of lips to engage the shaft at the site of the access hole, wherein said outer unit comprises at least one mortise protruding inwardly from an inner periphery of said outer unit;

an inner reinforcing unit having a central opening extending therethrough and an outer edge, wherein said second unit comprises a corresponding number of mating tenons to the at least one mortise, and wherein said mating mortises and tenons extend at least partially through a thickness of the inner and outer reinforcing units.

7. A hand access hole assembly for use in a tubular shaft having an access hole with a periphery, said assembly having an outer reinforcing unit and an inner reinforcing unit, said assembly having an outer edge, said outer edge defining a shape substantially corresponding to the periphery of the access hole in the shaft, said assembly comprising:

said outer reinforcing unit having a central opening extending therethrough and an outer edge, said outer edge engaging the shaft at the access hole, wherein said outer reinforcing unit comprises at least one first attachment mechanism;

said inner reinforcing unit comprises at least one second attachment which matingly engages said one first attachment mechanism;

wherein said assembly having at least one attachment hole disposed therethrough.

8. The hand access hole assembly of claim 7 wherein the outer reinforcing unit further comprises:

a first half;

a second half; and a joining means to join the first half to the second half.

9. The hand access hole assembly of claim 8 wherein the joining means further comprises:

at least one mating mortise and a tenon.

10. The hand access hole assembly of claim 7 wherein said first and said second attachment mechanisms comprise at least one mating mortise and tenon that extend completely through a thickness of said inner and said outer reinforcing units.

11. The hand access hole assembly of claim 7 wherein said outer reinforcing unit comprises at least one tenon and at least one mortise; and said inner reinforcing unit comprises at least one tenon and at least one mortise.

12. The hand access hole assembly of claim 7 wherein said assembly has at least two attachment holes disposed therethrough.

13. A pole comprising:

a tubular shaft having an access hole at a predetermined position in said shaft;

an assembly adapted to be positioned in conjunction with said access hole, said assembly including a first reinforcing unit having a central opening extending therethrough and an outer edge, said outer edge engaging said shaft at the position of said access hole, wherein said first reinforcing unit comprises at least one first attachment mechanism; and a second reinforcing unit having a central opening extending therethrough and an outer edge, wherein said second unit comprises at least one second attachment mechanism which engages said one first attachment mechanism.

14. The pole of claim 13 wherein the outer assembly further comprises:

a first half;

a second half; and a joining means to join the first half to the second half.

15. The pole of claim 14 wherein the joining means further comprises:

at least one mating mortise and a tenon.

16. The pole of claim 13 wherein said first and said second attachment mechanisms comprise at least one mating mortise and tenon that extend completely through a thickness of said first and said second reinforcing units.

17. The pole of claim 13 wherein said first and second reinforcing unit comprises at least one tenon and at least one mating mortise with the tenon.

18. The pole of claim 13 wherein said assembly has at least one attachment holes disposed therethrough.

* * * * *